(12) United States Patent
Hanke et al.

(10) Patent No.: US 8,303,687 B2
(45) Date of Patent: Nov. 6, 2012

(54) METHOD FOR ABSORBING CHLORINE FROM GAS STREAMS

(75) Inventors: Wolfgang Hanke, Leisnig (DE); Marcel Salamon, Grossenhain (DE)

(73) Assignee: Wacker Chemie AG, Munich (DE)

( * ) Notice: Subject to any disclaimer, the term of this patent is extended or adjusted under 35 U.S.C. 154(b) by 78 days.

(21) Appl. No.: 12/922,877

(22) PCT Filed: May 12, 2009

(86) PCT No.: PCT/EP2009/055715
§ 371 (c)(1),
(2), (4) Date: Sep. 16, 2010

(87) PCT Pub. No.: WO2009/138401
PCT Pub. Date: Nov. 19, 2009

(65) Prior Publication Data
US 2011/0011263 A1    Jan. 20, 2011

(30) Foreign Application Priority Data
May 15, 2008  (DE) .......................... 10 2008 001 795

(51) Int. Cl.
*B01D 53/14* (2006.01)
(52) U.S. Cl. .......................................... 95/233; 423/241
(58) Field of Classification Search ........................ None
See application file for complete search history.

(56) References Cited

U.S. PATENT DOCUMENTS

| | | | |
|---|---|---|---|
| 3,716,628 A | | 2/1973 | Klebe |
| 3,806,590 A | | 4/1974 | Klebe |
| 3,896,213 A | * | 7/1975 | Hirdler ..................... 423/232 |
| 4,082,631 A | | 4/1978 | Zirngiebl |
| 5,102,638 A | | 4/1992 | Girrbach |
| 5,160,707 A | | 11/1992 | Murray |
| 5,378,447 A | * | 1/1995 | Jackson et al. ............ 423/475 |
| 5,527,517 A | * | 6/1996 | Bridges et al. ............ 423/210 |
| 6,409,981 B1 | * | 6/2002 | Stitt et al. ................. 423/241 |
| 2007/0269358 A1 | * | 11/2007 | Kamper et al. ........... 423/241 |

FOREIGN PATENT DOCUMENTS

| | | |
|---|---|---|
| DE | 1963946 A | 7/1971 |
| DE | 2545342 A | 4/1977 |
| EP | 0406675 A1 | 1/1991 |
| SU | 697160 A | 11/1979 |
| WO | 9703749 A2 | 2/1997 |
| WO | 2007134717 A1 | 11/2007 |

OTHER PUBLICATIONS

Holleman, Wiberg: Lehrbuch der Anorganischen Chemie, 2007, Walter De Gruyter 102, p. 467.

* cited by examiner

*Primary Examiner* — Duane Smith
*Assistant Examiner* — Pankti Patel
(74) *Attorney, Agent, or Firm* — Brooks Kushman P.C.

(57) ABSTRACT

Chlorine is absorbed in water from gas streams of nitrogen, oxygen, argon, helium and mixtures thereof, in which process the formation of hypochlorous acid is suppressed through the regulated addition of hydrogen peroxide, and hydrochloric acid is formed.

9 Claims, No Drawings

METHOD FOR ABSORBING CHLORINE FROM GAS STREAMS

CROSS-REFERENCE TO RELATED APPLICATION

This application is the U.S. national phase of PCT Appln. No. PCT/EP2009/055715 filed May 12, 2009 which claims priority to German application DE 10 2008 001 795.7 filed May 15, 2008.

BACKGROUND OF THE INVENTION

1. Field of the Invention

The invention relates to a process for absorbing chlorine from gas streams in water with regulated addition of hydrogen peroxide.

2. Description of the Related Art

Industrial processes in which chlorine compounds are exposed to high temperatures (for example combustion of organochlorine compounds, chlorination reactions and hydrolysis reactions) form hydrogen chloride, which forms elemental chlorine with any oxygen present according to the Deacon equilibrium. This elemental chlorine is present in the offgas stream and has to be removed therefrom to comply with emissions limits.

Since the solubility of chlorine in water is low, chlorine is generally absorbed with basic absorbents, such as sodium hydroxide solution as described below by equations (1) and (2):

   (1)

   (2)

However, other basic absorbents (milk of lime, ammonia, amines, carbonates, hydrogencarbonates, etc.) are also possible.

In all basic absorption processes, the driving force is the formation of salts (chloride and hypochlorite). The result of these processes is formation of hypo-chlorite-containing salt solutions which find a limited range of applications (e.g. chlorine bleach) or are added to the wastewater after appropriate treatment. For this purpose, the hypochlorites formed must be reduced, which is typically done by adding sulfites, thiosulfates, hydrogen peroxide inter alia. For instance, in EP0406675, an absorption solution consisting of sodium hydrogencarbonate and sodium hydrogensulfite is used.

Absorption in acidic media has also been described. In this case, usually metal salts in low oxidation states (e.g. Fe2+, Cu1+, etc.) are used as absorbents, and are then converted to higher oxidation states by chlorine (see, for example, DE-A 2545342).

All processes described above form salt solutions which only have limited further utility.

Additionally described is the separating-out of chlorine with organic solvents. For instance, compounds such as tetrachloromethane, dichlorotoluene, dichlorobenzotrifluoride, etc. are used in this process. These substances have the disadvantage of possessing a noticeable vapor pressure, and have to be removed in turn from the cleaned gas streams.

SU 697160 describes a method for cleaning offgases which comprise boron chloride, titanium chloride, and also chlorine, hydrogen chloride and phosgene. This method requires concentrated hydrochloric acid in one stage and hydrogen peroxide in hydrochloric acid solution in a further stage as absorbents. This method is further characterized in that it works without waste and hence without wastewater. What is described is a batch process in which a concentrated 35% hydrochloric acid and a 9-30% hydrogen peroxide solution are first initially charged and then the offgas is passed through.

SUMMARY OF THE INVENTION

It was an object of the present invention to provide a simple continuous process for absorbing chlorine from gas streams, which affords utilizable products. These and other objects are accomplished by absorbing chlorine-containing gas streams in water in conjunction with the regulated addition of hydrogen peroxide.

DETAILED DESCRIPTION OF THE PREFERRED EMBODIMENTS

The present invention thus provides a process for absorbing chlorine from gas streams selected from those containing nitrogen, oxygen, carbon dioxide, argon, helium and mixtures thereof, in water, in which the formation of hypochlorous acid is suppressed by the regulated addition of hydrogen peroxide, and hydrochloric acid is formed.

It has been found that, in spite of the low solubility of chlorine in water, water can also be used for the absorption of chlorine-containing gas streams if conditions which suppress the formation of hypochlorous acid according to equation 1 are established. The process according to the invention does not require concentrated hydrochloric acid in an upstream scrubbing stage and works continuously.

It has been found that chlorine in an absorption solution in hydrochloric acid which has been obtained by introducing chlorine into water, on addition of hydrogen peroxide, reacts to give hydrochloric acid and can be bound within the absorbent in this way. A continuous absorption plant constructed on this basis generates a wastewater stream which does not comprise any salts and comprises small amounts, if any, of hypochlorous acid, but does contain utilizable hydrochloric acid. The addition of hydrogen peroxide can be adjusted such that the hydrochloric acid formed does not contain any hypochlorous acid.

In the process according to the invention, preference is given to initially charging water and to adding hydrogen peroxide in a regulated manner according to the requirements which arise from the chlorine concentrations of the gas phase. The hydrochloric acid formed in the process constitutes a salt-free wastewater stream which can not only be discharged as wastewater but also enables utilization of the material in further processes.

Preference is given to using, in the process, gas streams which comprise, in addition to chlorine, not more than 10 parts by volume, more preferably not more than 3 parts by volume, especially and most preferably not more than 1 part by volume, based in each case on 100 parts by volume of chlorine, of other gaseous constituents absorbable in water. Other gaseous constituents in the gas stream which are absorbable in water may, for example, be hydrogen chloride and hydrogen fluoride.

The gas stream used may especially be air.

In a preferred embodiment, the chlorine-containing gas stream passes successively through two or more stages, in which case the hydrogen peroxide concentrations of the aqueous phases preferably increase in the gas flow direction.

For the absorption of chlorine from gas streams, it is possible to use apparatuses known per se, for example tray columns, columns with random packings and scrubbers such as spray scrubbers, or wet-operated dust precipitators.

The hydrochloric acid formed in the process preferably has a concentration of at least 0.5%, and at most 18%. The hydrochloric acid formed in the process is preferably utilized in further processes.

EXAMPLES

Unless stated otherwise, all amounts and percentages are based on weight.

1a Noninventive

A chlorine-containing inert gas stream is passed into a scrubber which is operated with a sodium hydroxide solution absorption circuit. Wastewater flows to a wastewater treatment process which adjusts the pH and converts the NaOCl burden to NaCl with the aid of a reducing agent, and releases it as wastewater. All of the chlorine separated out is converted to sodium chloride and released into the wastewater. This chlorine is thus removed from the integrated system and is lost.

1b Inventive

A chlorine-containing inert gas stream is passed into one or more scrubbers which is/are operated with a hydrochloric acid absorption circuit to which water and hydrogen peroxide are fed or are added via trays. The hydrochloric acid obtained is sent to a hydrogen chloride absorption.

2a Noninventive

A chlorine-containing inert gas stream is passed into a scrubber which is operated with a pH-regulated sodium hydroxide solution absorption circuit. Sodium hypo-chlorite formed is converted to NaCl by the redox-regulated addition of hydrogen peroxide. A salt-containing wastewater stream leaves the scrubber.

2b Inventive

A chlorine-containing inert gas stream is passed into one or more scrubbers which is/are operated with a hydrochloric acid absorption circuit to which water and hydrogen peroxide are fed under redox and conductivity control and/or are added via trays. The hydrochloric acid obtained is used in a separate production process.

3 Inventive

A gas stream with a chlorine content of 1.7%, a hydrogen chloride content of 0.017%, a carbon dioxide content of 3.6% and a nitrogen content of 71.2% was introduced at 37° C. and a reduced pressure of 20 mbar into a water-filled column with random packing. The regulated addition of hydrogen peroxide produced a wastewater stream with a hydrochloric acid concentration of 2%, which did not contain any hypochlorous acid.

The invention claimed is:

1. A process for absorbing chlorine in the form of $Cl_2$ in water from gas streams containing nitrogen, oxygen, carbon dioxide, argon, helium and mixtures thereof, further containing less than about 10 parts, per 100 parts by volume of chlorine, of gaseous constituents absorbable in water, other than chlorine, in which the formation of hypochlorous acid is suppressed by the regulated addition of hydrogen peroxide, and a salt-free aqueous solution of hydrochloric acid is formed and recovered.

2. The process of claim 1, wherein gas streams which comprise, in addition to chlorine, not more than 3 parts by volume, based on 100 parts by volume of chlorine, of other gaseous constituents absorbable in water are used.

3. The process of claim 1, in which the chlorine-containing gas stream is air.

4. The process of claim 2, in which the chlorine-containing gas stream is air.

5. The process of claim 1, wherein the chlorine-containing gas stream passes successively through two or more absorption stages.

6. The process of claim 1, wherein the apparatus used to absorb chlorine is selected from the group consisting of tray columns, columns with random packings, scrubbers, and wet-operated dust precipitators.

7. The process of claim 1, wherein the salt-free aqueous solution of hydrochloric acid is free of hypochlorite.

8. The process of claim 1, wherein the salt-free aqueous solution of hydrochloric acid has a hydrogen chloride content of at least 0.5% by weight and not more than 18% by weight.

9. The process of claim 1, wherein the salt-free aqueous solution of hydrochloric acid is reused in a further process which employs hydrochloric acid.

* * * * *